United States Patent [19]

Werner

[11] Patent Number: 5,150,641
[45] Date of Patent: Sep. 29, 1992

[54] APPARATUS FOR SLICING A WORKPIECE

[76] Inventor: Peter G. Werner, Pestalozzistrasse 38, 5014 Kerpen, Fed. Rep. of Germany

[21] Appl. No.: 583,391

[22] Filed: Sep. 14, 1990

[30] Foreign Application Priority Data

Sep. 23, 1989 [DE] Fed. Rep. of Germany ....... 3931837

[51] Int. Cl.$^5$ .............................................. B26D 1/10
[52] U.S. Cl. ........................................ 83/647; 83/777; 83/783; 125/16.01; 125/18
[58] Field of Search ............... 83/597, 607, 662, 777, 83/783, 642, 643, 647, 835, 697; 125/19, 18, 16.01, 16.03, 16.04

[56] References Cited

U.S. PATENT DOCUMENTS

| 1,060,157 | 4/1913 | Brazier | 83/777 X |
| 1,230,991 | 6/1917 | Briggs | 83/777 X |
| 4,474,164 | 10/1984 | Lauga | 125/16 R |

FOREIGN PATENT DOCUMENTS 240463 5/1910 Fed. Rep. of Germany.
553031 6/1932 Fed. Rep. of Germany.

OTHER PUBLICATIONS

G. Werner et al., "Trennen von Silizium"-IDR Jan. 1989, pp. 10-18.

Primary Examiner—Frank T. Yost
Assistant Examiner—Kenneth E. Peterson
Attorney, Agent, or Firm—Herbert Dubno; Andrew Wilford

[57] ABSTRACT

The blade having a convex or concave edge and a workpiece engaged by the blade are relatively displaced by an oscillating parallelogrammatic linkage so that an arcuate contour is cut in the workpiece. The oscillating radius of the parallelogrammatic linkage and the radii of the curvature of the blade and the cut contour are dimensioned so that the contact between the cutting edge of the blade and the workpiece is a quasi-point contact. This allows rapid cutting for thin pressure-sensitive materials.

4 Claims, 4 Drawing Sheets

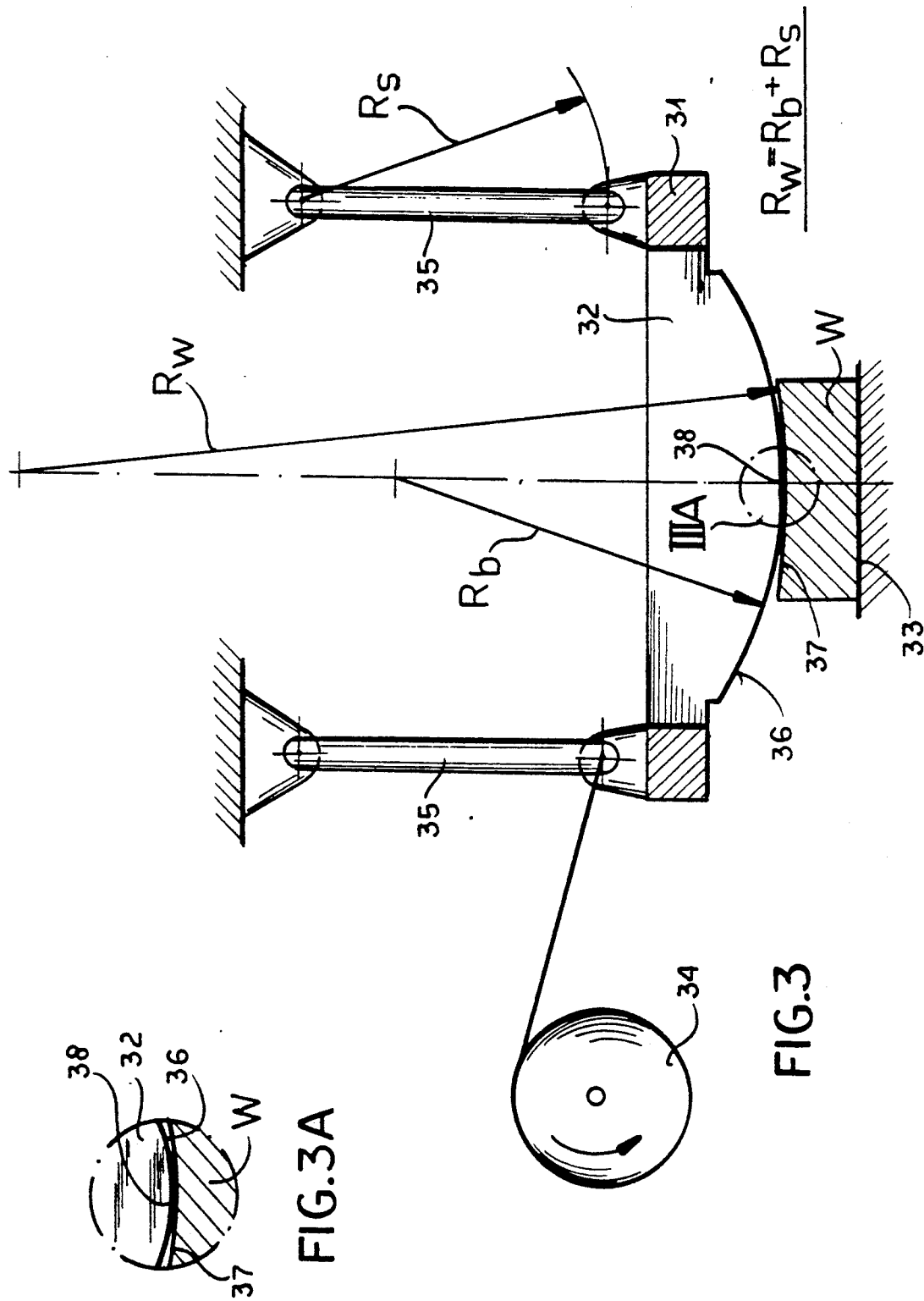

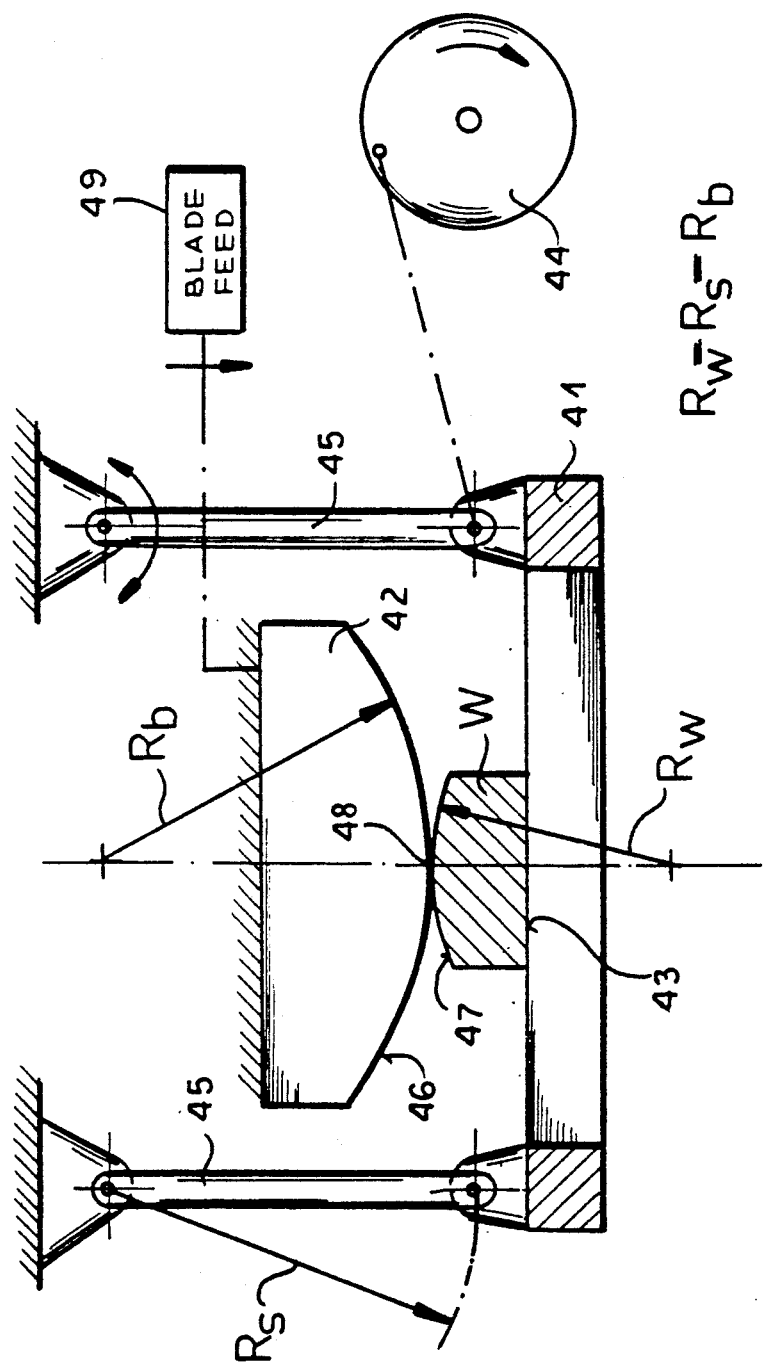

APPARATUS FOR SLICING A WORKPIECE

FIELD OF THE INVENTION

My present invention relates to an apparatus for slicing a workpiece, and more particularly, to an apparatus of the type which utilizes a periodically oscillated tool holder carrying at least one blade-like cutting tool for the material-removal or kerf-slicing of a workpiece.

BACKGROUND OF THE INVENTION

It is known to provide a rocker or oscillating-type cutting device in which the blade is mounted on a parallelogrammatic linkage, i.e. a linkage having two mutually parallel spaced-apart arms articulated to respective members so that one of these members will move more or less parallel to itself as the linkage is rocked to and fro by a respective drive.

In the present application, the reference to a parallelogrammatic linkage is intended to include a classical linkage of this type having two such parallel links or arms which have essentially the same effective lengths, as well as any other linkage or kinematic mechanism capable of generating parallel movement of a member. With the aid of modern computer-controlled drive and control systems, the parallelogrammatic linkage can be simulated by other mechanisms which are intended to be included within the definition of a parallelogrammatic linkage here.

The workpieces, which are intended to be used according to the invention, can be silicon blocks and like sensitive workpieces from which thin silicon plates or the like must be sliced.

In a prior slicing system utilizing a parallelogrammatic linkage and drive, intended for the cutting of stone, namely German patent 553,031 from 1932, the cutting edge of the tool in side view has an inverted roof ridge shape with a large apex angle so that the cutting edge is almost perfectly straight. The roof-shaped configuration facilitates chip removal in the cutting operation.

In this earlier system, there is a long and continuous line of contact between the cutting edge and the cutting contour. Even at high pressing forces between the cutting blade and the workpiece, because of its extended line contact, the cutting action has only limited efficiency. Nevertheless the efficiency requires optimization of the pressing force and in the conventional device additional control means and systems must be provided for regulating the pressing force.

More modern technology developed especially for silicon and other sensitive workpieces (see reprint from Industriediamanten-Rundschau IDR 23, 1989, Nr. 1, Prof. Dr.-Ing. P. G. Werner, Dipl.-Ing. M. Kenter, Dipl.-Ing. M. Cinar "Stand der Technik und zukünftige Entwicklungsmöglichkeiten beim Trennen von Silicium") has not successfully avoided the drawbacks of this system.

OBJECTS OF THE INVENTION

It is, therefore, the principal object of the invention to provide an apparatus of the aforedescribed type that can attain a high slicing or cutting rate with minimum pressing force and is especially useful in the slicing of silicon and other sensitive workpieces.

Another object of the invention is to provide an improved apparatus for the purposes described which is free from the drawbacks of earlier systems.

SUMMARY OF THE INVENTION

These objects and others which will become apparent hereinafter are attained, in accordance with the present invention in an apparatus for slicing a workpiece, comprising:

a support member for supporting a workpiece to be sliced;

a cutting blade member juxtaposed with the workpiece and having a cutting edge in the shape of a circular arc with a blade-edge radius $R_b$ in contact with a cutting contour of the workpiece and having a width corresponding to a kerf formed in the workpiece;

a parallelogrammatic linkage carrying one of the members for oscillating the one of the members relative to the other of the members with an oscillation radius $R_S$ to cause the blade to slice through the workpiece and subdivide the same while producing the contour, the oscillating of the one of the members imparting a circular arc configuration to the contour with a cutting contour radius $R_W$ which is different from the blade-edge radius $R_b$, the oscillation radius $R_S$ being selected so that the slicing contact between the blade member and the workpiece is a quasi-point contact; and drive means coupled with the linkage for oscillating same.

In the chip-removal slicing of a workpiece, it is known to operate with tools whose cutting edges are of the configuration of a circular arc and which also generate a cutting contour of circular arc configuration. (See German patent 240,463 and U.S. Pat. No. 4,474,164.) In these cases, however, the tools operate without any relationship which ensures that the working contact between the cutting edge and the cutting contour will be a quasi-point contact. The term "quasi-point contact" is used herein to refer to a contact which is as close to a point contact that two osculating curved surfaces can permit. However, since the cutting edge will bite into the workpiece, that contact in practice may extend somewhat over an area greater than a point.

The invention is based upon my discovery that it is possible to design the parallelogrammatic linkage to ensure practically only a point contact between the cutting edge and the cutting contour by appropriate correlation of the geometries of the cutting contour and the cutting edge with the parallelogrammatic linkage. The requisite oscillation radius of the parallelogrammatic linkage to provide point contact could be easily determined empirically by simple experiments. The extent to which the contact may develop beyond the point in the direction of oscillation will depend upon the pressing force with which the blade is urged into the workpiece. The contact point, of course, will travel over the width of the workpiece and the length of the cutting edge.

In one embodiment of the invention, where the blade member is mounted on the linkage, the linkage is located on a side of the cutting edge opposite that at which the workpiece is provided and has a pair of parallel swing arms articulated with a spacing of the radius $R_S$, the relationship between the oscillation radius $R_S$, the blade-edge radius $R_b$ and the cutting contour radius $R_W$ being defined by the equation:

$$R_W = R_b - R_S$$

Wherein the blade-edge radius $R_b$ is greater than the oscillation radius $R_S$ and the blade edge is concave.

Alternatively, the parallelogrammatic linkage is located on the same side of the cutting edge as that at which the workpiece is provided and has a pair of parallel swing arms articulated with a spacing of the radius $R_S$, the relationship between the oscillation radius $R_S$, the blade-edge radius $R_b$ and cutting contour radius $R_W$ being defined by the equation:

$$R_W = R_S - R_b$$

wherein the blade-edge radius $R_b$ is smaller than the oscillation radius $R_S$ and the blade edge is convex.

It is also possible for the parallelogrammatic linkage to be located on a side of the cutting edge opposite that at which the workpiece is provided and has a pair of parallel swing arms articulated with a spacing of the radius $R_S$, the relationship between the oscillation radius $R_S$, the blade-edge radius $R_b$ and the cutting contour radius $R_W$ being defined by the equation:

$$R_W = R_b - R_S$$

wherein the blade-edge radius $R_b$ and the oscillation radius $R_S$ are smaller than the cutting contour radius $R_W$, and the blade edge is convex.

In accordance with the invention, a variation is possible in that the tool holder may be held fixed and the workpiece mounted on the parallelogrammatic linkage for movement therewith.

According to the invention, during the working stroke of the tool, a point-like contact between a region of the tool and a region of the workpiece is maintained so that a relatively high specific contact force, even at a relatively small total force, can be generated which precludes overloading the tool or the workpiece in spite of a high slicing rate.

Because of the travel of the contact point along the working piece to be sliced and the curved configuration of the cutting edge and the cutting contour, excellent discharge of the cutting detritus, chips or the like and uniform tool wear can be ensured.

By appropriate selection of the tool, the cutting speed can be greatly increased over prior art slicing techniques so that, for example, the workpiece can be fed into the tool at substantially higher rates, thereby reducing the cutting time and providing major economical advantages for the system of the invention.

It has been found to be especially advantageous to have the contact point between the cutting edge and the workpiece travel over the entire length of the Kerf. This means that during the stroke of the blade, every point of the tool-working region comes in contact with the workpiece and also that every point of the cutting contour is brought into contact with the tool. As a consequence, the wear at every point along the working region of the cutting edge is substantially the same so that the curvature of the working region remains substantially constant.

The relatively low total cutting force which is employed in accordance with the invention permits a significantly reduced width of the cut section so that it is possible, for example, to slice granite blocks into plates of a thickness of 10 m or less, while with the present day separation methods, cut thicknesses below 30 mm are not possible because of the high total cutting force.

BRIEF DESCRIPTION OF THE DRAWING

The above and other objects, features and advantages of the present invention will become more readily apparent from the following description, reference being made to the accompanying drawings in which:

FIG. 1A is a detail view of the region IA of FIG. 1;

FIG. 3 is a view similar to FIG. 1 of a third embodiment;

FIG. 3A is a detail view of the region IIIA of FIG. 3; and

FIG. 4 shows a kinematic reversal of the apparatus of FIF. 2.

SPECIFIC DESCRIPTION

Figure 1:
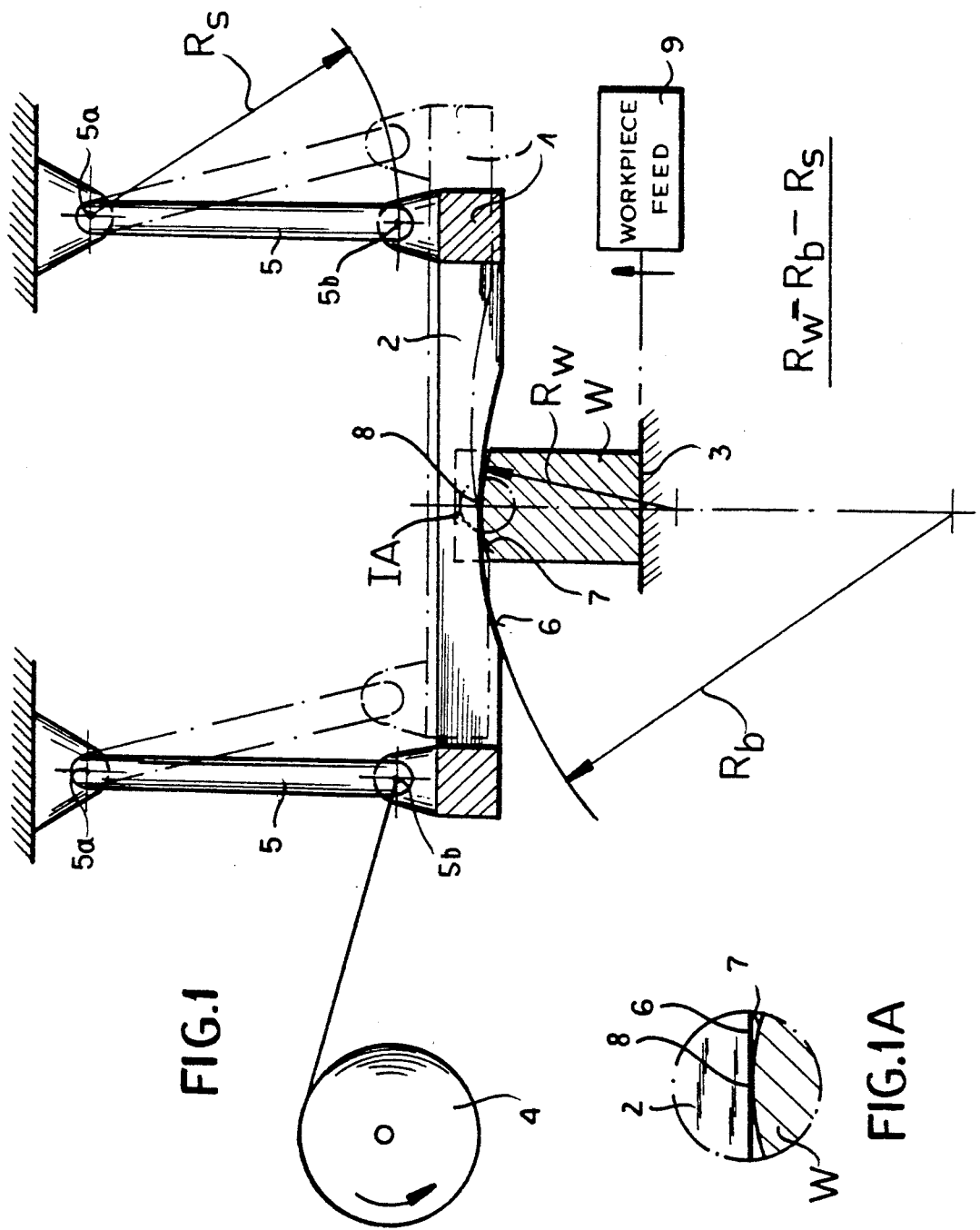
FIG. 1 is a cross sectional view schematically illustrating a first embodiment of the invention.

Referring to FIGS. 1 and 1A which show the basic elements of an apparatus according to the invention, it can be seen that the apparatus comprises a periodically displaceable tool holder 1, a blade-like tool 2, a workpiece support 3 on which the workpiece W is mounted, and a drive 4 for oscillating the tool 2.

The drive 4 imparts a rocker-type movement to the parallelogrammatic linkage which has the mutually parallel arms 5 articulated at 5a and 5b to a support and to the tool support member 1, respectively, so that the parallelogrammatic linkage formed by the support member 1 and the arms or links 5 will have an oscillation with an oscilaltion radius $R_S$.

The tool 2 has a nonstraight cutting edge 6, The tool 2 generates in the workpiece W a kerf and in this kerf, a curved bottom has a predetermined cutting contour 7. Because the workpiece has been broken away in FIGS. 1 and 1A, the kerf is not clearly visible except for its floor.

Figure 2:
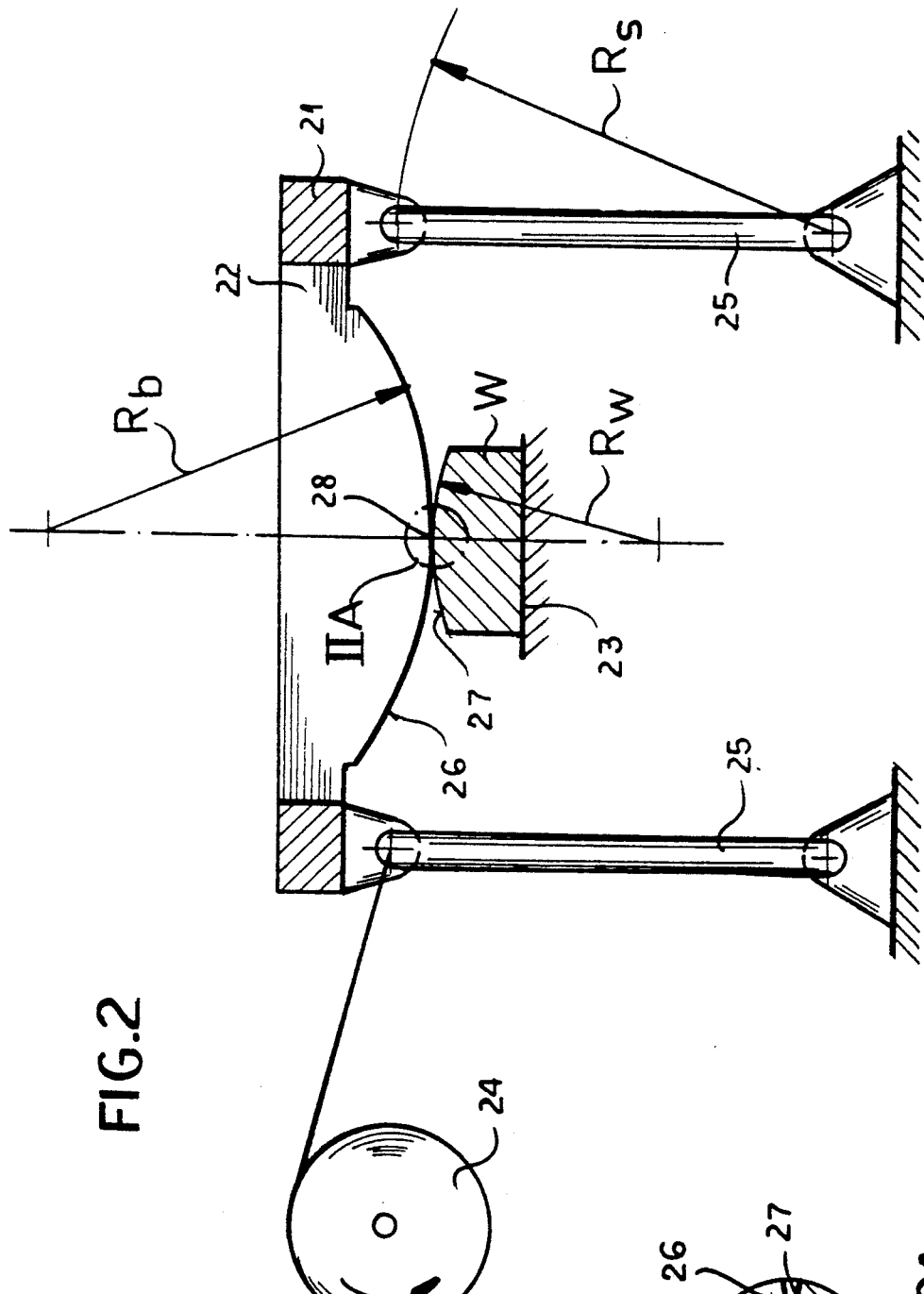
FIG. 2 is a view similar to FIG. 1 of another embodiment of the invention.
Figure 2A:
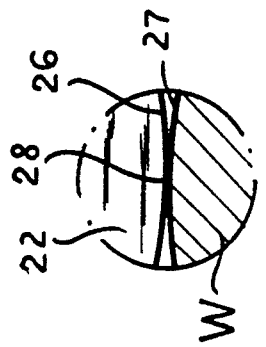
FIG. 2A is a details view of the region IIA of FIG. 2.

In the embodiment of FIG. 1, the cutting edge 6 has a concave circular-arc configuration. In FIG. 2, in which corresponding parts are designated by corresponding reference numerals preceded by a "2" in the tens position, the circular-arc configurations of the cutting edge 26 of the blade 22 is a convex configuration.

A convex cutting blade 36 is provided as well in the embodiment of FIG. 3 in which corresponding parts have corresponding reference numerals preceded by a "3" in the tens position. In FIG. 4 which represents a kinematic reversal of the embodiment of FIG. 2, corresponding parts are represented by the same reference numerals preceded by a "4" and the cutting edge 46 also has a circular arc configuration and is convex. In all of the embodiments, the cutting egde 6, 26, 36, 46 has a cutting-edge radius $R_b$.

In all cases the cutting edge radius $R_b$ of the cutting edge 6, 26, 36, 46 is greater or less than the cut contour radius $R_W$. The oscillation radius $R_S$ is always selected that between the cutting edge 6, 26, 36, 46 and the respective cut contour 7, 27, 37, 47, a working contact in the form of a quasi-point contact 8, 28, 38, 48 is effected.

In the embodiment of FIG. 1, between cut contour radius $R_W$, the cut edge radius $R_b$ of the cutting edge 6 and the oscillation radius $R_S$, the equation $R_W = R_b - R_S$ applies. This equation can also be seen in FIG. 1. In this embodiment as well, the cut edge radius $R_b$ is greater than the oscillation radius $R_S$ and the cut contour radius $R_W$ for the cutting contour 7. The cutting edge is here concave. In the embodiment of FIG. 2, wherein the parallelogrammatic linkage is on the same side of the cutting edge 26 as the workpiece W, the relevant equation is $R_W = R_S - R_b$, the cutting edge radius $R_b$ is smaller than the oscillation radius $R_S$ and the oscillation radius $R_S$ is greater than the cut contour radius $R_W$ of the cut contour 27. Here the cutting edge 26 is convex.

For the embodiment of FIG. 3, the applicable equation is $R_W = R_b + R_S$, the cutting edge radius $R_b$ and the oscillation radius $R_S$ are smaller than the cut contour radius $R_W$ and the cutting edge 36 is convex. In the embodiment of FIG. 4, wherein the support 43 of the workpiece 47 is oscillated by the drive 44 and forms part of the parallelogrammatic linkage with the arms 45, the blade 46 need not be oscillated and, with respect to oscillatory movement, can be fixed. A drive 44 is provided here for oscillating the workpiece.

In this embodiment as in the embodiment of FIG. 2, the relationship $R_W = R_S - R_b$ applies and $R_S$ is greater than $R_W$ and $R_b$.

In the embodiments of FIGS. 1 and 4, I have illustrated the workpiece feeder 9 and a blade feeder 49, respectively, which advances the workpiece into the blade or the blade into the workpiece, respectively, to advance the kerf through the workpiece and apply the cutting force at the quasi-point contact 8, 48, respectively. Similar feeders, will, of course, be provided in FIGS. 2 and 3 as well.

While the blades 2, 22, 32, 42 are nonrotatable in the embodiments illustrated, it will be understood that the cutting edges 6, 26, 36, 46 can be rotating cutting edges as well. In the case of concave cutting edges, therefore, the cutting edge will be an inner edge of a blade having a hole, whereas in the case of a convex cutting edge, the cutting edge can be the outer periphery of a rotating blade.

In either case, the rotating blade is driven by a motor which can be fixed in position while the workpiece is oscillated or oscillated by the parallelogrammatic linkage as has been described.

The cutting edge can be provided with sawteeth, abrasive grains such as diamond particels, or any other chip or material-removal structure enabling te blade to cut through the workpiece.

I claim:

1. In an apparatus for slicing a workpiece, the apparatus comprising:
    a support member carrying the workpiece to be sliced;
    an elongated cutting blade member juxtaposed with the workpiece and having an arcuate cutting edge in the shape of a circular arc with a blade-edge radius $R_b$ in contact with the workpiece;
    a pair of links forming a parallelogrammatic linkage carrying one of the members for oscillating the one member relative to the other of the members parallel to the elongated blade member with an oscillation radius $R_S$ equal to an effective link length; and
    drive means coupled with the linkage for oscillating same and including means for displacing the one member toward the other member and causing the blade to cut into the workpiece therein and form therein a kerf having a floor with a circularly arcuate contour having a curvature radius $R_W$ extending between two kerf ends, the improvement wherein
    the effective link length and blade are constructed such that the blade-edge radius $R_b$ is greater than the oscillation radius $R_S$;
    the difference between the blade-edge radius $R_b$ and the oscillation radius $R_S$ is equal to the curvature radius $R_W$ of the kerf and is such that the blade edge contacts the kerf in quasi-point contact along its entire length between the kerf ends as the linkage is oscillated.

2. The slicing apparatus defined in claim 1 wherein the blade member is mounted on the linkage.

3. In an apparatus for slicing a workpiece, the apparatus comprising:
    a support member carrying the workpiece to be sliced;
    an elongated cutting blade member juxtaposed with the workpiece and having an arcuate cutting edge in the shape of a circular arc with a blade-edge radius $R_b$ in contact with the workpiece;
    a pair of links forming a parallelogrammatic linkage carrying one of the members for oscillating the one member relative to the other of the members parallel to the elongated blade member with an oscillation radius $R_S$ equal to an effective link length; and
    drive means coupled with the linkage for oscillating same and including means for displacing the one member toward relative to the other member and causing the blade to cut into the workpiece therein and form therein a kerf having a floor with a circularly arcuate contour having a curvature radius $R_W$ extending between two kerf ends, the improvement wherein
    the effective link length and blade are constructed such that the oscillation radius $R_S$ is greater than the blade-edge radius $R_b$;
    the difference between the blade-edge radius $R_b$ and the oscillation radius $R_S$ is equal to the curvature radius $R_W$ of the kerf and is such that the blade edge contacts the kerf in quasi-point contact along its entire length between the kerf ends as the linkage is oscillated.

4. The slicing apparatus defined in claim 3 wherein the blade member is mounted on the linkage.

* * * * *

UNITED STATES PATENT AND TRADEMARK OFFICE
CERTIFICATE OF CORRECTION

PATENT NO. : 5,150,641
DATED : Sep. 29, 1992
INVENTOR(S) : Peter G. Werner

It is certified that error appears in the above-identified patent and that said Letters Patent is hereby corrected as shown below:

Column 6, lines 48 and 49, for "the difference between the blade-edge radius $R_b$ and the oscillation radius $R_s$" read: -- the difference between the blade-edge radius $R_s$ and the oscillation radius $R_b$ --.

Signed and Sealed this

Ninth Day of November, 1993

Attest:

BRUCE LEHMAN

*Attesting Officer*    *Commissioner of Patents and Trademarks*